(12) United States Patent
Spellward et al.

(10) Patent No.: US 10,445,415 B1
(45) Date of Patent: Oct. 15, 2019

(54) GRAPHICAL SYSTEM FOR CREATING TEXT CLASSIFIER TO MATCH TEXT IN A DOCUMENT BY COMBINING EXISTING CLASSIFIERS

(71) Applicants: Peter C. Spellward, Bristol (GB); Howard C. Snart Woodhouse, Bristol (GB)

(72) Inventors: Peter C. Spellward, Bristol (GB); Howard C. Snart Woodhouse, Bristol (GB)

(73) Assignee: CA, Inc., New York, NY (US)

( * ) Notice: Subject to any disclaimer, the term of this patent is extended or adjusted under 35 U.S.C. 154(b) by 567 days.

(21) Appl. No.: 13/828,003

(22) Filed: Mar. 14, 2013

(51) Int. Cl.
G06F 17/24 (2006.01)
G06F 17/27 (2006.01)
G06F 16/35 (2019.01)

(52) U.S. Cl.
CPC .............. *G06F 17/24* (2013.01); *G06F 16/35* (2019.01); *G06F 16/353* (2019.01); *G06F 16/355* (2019.01); *G06F 16/358* (2019.01); *G06F 17/277* (2013.01); *G06F 17/2765* (2013.01)

(58) Field of Classification Search
CPC .............. G06F 17/277; G06F 17/2765; G06F 17/30705; G06F 17/30707; G06F 17/30713; G06F 16/35; G06F 16/353; G06F 16/355; G06F 16/358
USPC ......................................................... 715/256
See application file for complete search history.

(56) References Cited

U.S. PATENT DOCUMENTS

| | | | | |
|---|---|---|---|---|
| 6,081,620 | A * | 6/2000 | Anderholm | G06K 9/2054 382/181 |
| 6,278,996 | B1 * | 8/2001 | Richardson | G06F 17/273 |
| 6,496,835 | B2 * | 12/2002 | Liu | G06F 17/30569 |
| 6,606,620 | B1 * | 8/2003 | Sundaresan et al. | |
| 6,691,122 | B1 * | 2/2004 | Witte | G06N 5/04 706/47 |
| 6,839,665 | B1 * | 1/2005 | Meyers | G06F 17/27 704/9 |
| 6,983,236 | B1 * | 1/2006 | Karlovac | G06Q 30/0603 703/22 |
| 8,122,005 | B1 * | 2/2012 | Juang | G06F 17/30707 706/12 |
| 8,473,442 | B1 * | 6/2013 | Deninger | G06N 5/02 706/47 |
| 8,484,194 | B1 * | 7/2013 | Juang | G06F 16/353 707/710 |
| 8,548,964 | B1 * | 10/2013 | Nair | G06F 17/30705 707/694 |
| 8,645,384 | B1 * | 2/2014 | Juang | G06F 17/30722 707/738 |

(Continued)

*Primary Examiner* — Cesar B Paula
*Assistant Examiner* — Yahao Chen
(74) *Attorney, Agent, or Firm* — Baker Botts L.L.C.

(57) ABSTRACT

A computer program product includes a computer readable storage medium with computer readable program code. The computer readable program code may be configured to store a plurality of classifiers. The computer readable program code may be configured to store a document with one or more first portions of text associated with a first classifier. The computer readable program code also may be configured to display the document. The computer readable program code may be configured to change a feature of the first portions of text displayed in the document to indicate that the first portions of text are associated with the first classifier.

20 Claims, 5 Drawing Sheets

(56) References Cited

U.S. PATENT DOCUMENTS

| | | | |
|---|---|---|---|
| 8,682,906 B1* | 3/2014 | Carasso | G06F 3/0484 707/749 |
| 8,725,732 B1* | 5/2014 | Jeh et al. | 707/736 |
| 8,751,963 B1* | 6/2014 | Carasso | G06F 7/24 715/808 |
| 8,880,611 B1* | 11/2014 | Lim | H04L 51/12 709/204 |
| 9,116,980 B1* | 8/2015 | Harper | G06F 17/30705 |
| 9,183,274 B1* | 11/2015 | Zhang | G06F 17/2785 |
| 9,218,427 B1* | 12/2015 | Thompson, III | G06F 16/9537 |
| 2001/0011270 A1* | 8/2001 | Himmelstein | G06F 17/3087 |
| 2003/0172357 A1* | 9/2003 | Kao | G06F 17/30707 715/256 |
| 2004/0036716 A1* | 2/2004 | Jordahl | G06F 16/24578 715/713 |
| 2004/0049498 A1* | 3/2004 | Dehlinger et al. | 707/3 |
| 2004/0064464 A1* | 4/2004 | Forman et al. | 707/100 |
| 2004/0117385 A1* | 6/2004 | Diorio | G06F 17/27 |
| 2004/0204940 A1* | 10/2004 | Alshawi | G10L 15/063 704/240 |
| 2005/0022115 A1* | 1/2005 | Baumgartner | G06F 17/30911 715/205 |
| 2005/0187911 A1* | 8/2005 | Tunning | G06F 16/90332 |
| 2005/0234952 A1* | 10/2005 | Zeng | G06F 17/30631 |
| 2006/0167873 A1* | 7/2006 | Degenaro | G06F 9/45512 |
| 2006/0242180 A1* | 10/2006 | Graf | G06F 17/30917 |
| 2006/0245641 A1* | 11/2006 | Viola | G06F 17/2715 382/155 |
| 2006/0282442 A1* | 12/2006 | Lennon | G06F 17/30011 |
| 2007/0050413 A1* | 3/2007 | Kominek | G06F 17/30899 |
| 2007/0078872 A1* | 4/2007 | Cohen | G06F 17/30696 |
| 2007/0094060 A1* | 4/2007 | Apps | G06F 17/30398 705/7.36 |
| 2007/0174255 A1* | 7/2007 | Sravanapudi et al. | 707/3 |
| 2007/0198447 A1* | 8/2007 | Tilford et al. | 706/20 |
| 2007/0198565 A1* | 8/2007 | Ivanov | G06F 17/241 |
| 2007/0214134 A1* | 9/2007 | Haselden | G06F 17/30985 |
| 2007/0214140 A1* | 9/2007 | Dom et al. | 707/7 |
| 2007/0266019 A1* | 11/2007 | Lavi | G06F 17/30867 |
| 2008/0059486 A1* | 3/2008 | Pappas | G06F 17/30392 |
| 2008/0104101 A1* | 5/2008 | Kirshenbaum | G06F 17/30539 |
| 2008/0133443 A1* | 6/2008 | Bohannon | G06F 17/2705 706/48 |
| 2008/0144881 A1* | 6/2008 | Fortune | G06K 9/00449 382/100 |
| 2008/0154820 A1* | 6/2008 | Kirshenbaum | G06K 9/6292 706/20 |
| 2009/0083265 A1* | 3/2009 | Michailov | G06F 17/30985 |
| 2009/0119268 A1* | 5/2009 | Bandaru | G06F 17/2745 705/7.12 |
| 2009/0119307 A1* | 5/2009 | Braun | G06F 17/30985 |
| 2009/0276506 A1* | 11/2009 | Tiwari | G06F 17/248 709/220 |
| 2009/0299977 A1* | 12/2009 | Rosales | G06F 17/30525 |
| 2010/0005056 A1* | 1/2010 | Bayliss | G06F 16/24578 707/E17.005 |
| 2010/0031141 A1* | 2/2010 | Summers | G06F 17/30926 715/239 |
| 2010/0042625 A1* | 2/2010 | Zoellner | G06F 17/30115 707/748 |
| 2010/0115436 A1* | 5/2010 | Embley | G06F 17/30734 715/763 |
| 2010/0161536 A1* | 6/2010 | Clark | H04L 63/1416 706/46 |
| 2010/0293451 A1* | 11/2010 | Carus | 715/230 |
| 2011/0078554 A1* | 3/2011 | Nie | G06F 17/278 715/234 |
| 2011/0282649 A1* | 11/2011 | Waksberg | G06F 16/972 704/8 |
| 2012/0072859 A1* | 3/2012 | Wang et al. | 715/764 |
| 2012/0106857 A1* | 5/2012 | Schneiderman | 382/224 |
| 2012/0124064 A1* | 5/2012 | Syrowitz | G06F 17/30985 707/754 |
| 2012/0224765 A1* | 9/2012 | Kim et al. | 382/159 |
| 2013/0024407 A1* | 1/2013 | Thompson | G06F 17/30707 706/12 |
| 2013/0061124 A1* | 3/2013 | Patton | G06F 17/243 715/224 |
| 2013/0067319 A1* | 3/2013 | Olszewski et al. | 715/234 |
| 2013/0159348 A1* | 6/2013 | Mills | G06F 17/30705 707/777 |
| 2013/0194171 A1* | 8/2013 | Ocke | G06F 17/30946 345/156 |
| 2013/0218872 A1* | 8/2013 | Jehuda | G06F 17/30864 707/722 |
| 2014/0032480 A1* | 1/2014 | Lesage | G06F 17/243 707/607 |
| 2014/0188889 A1* | 7/2014 | Martens et al. | 707/740 |
| 2014/0207792 A1* | 7/2014 | Carasso | G06F 17/271 707/748 |
| 2014/0208218 A1* | 7/2014 | Carasso | G06Q 10/00 715/738 |

\* cited by examiner

GRAPHICAL SYSTEM FOR CREATING TEXT CLASSIFIER TO MATCH TEXT IN A DOCUMENT BY COMBINING EXISTING CLASSIFIERS

BACKGROUND

The present disclosure relates to classifiers, and more specifically, to designing classifiers.

A classifier is a tool used in content analysis. Classifiers are defined to attempt to identify characteristics of portions of text in a document. For example, a classifier could be configured to attempt to identify personally identifiable information, such as social-security numbers, birthdates, and addresses.

BRIEF SUMMARY

According to one aspect of the present disclosure, a computer program product includes a computer readable storage medium with computer readable program code. The computer readable program code may be configured to store a plurality of classifiers. The computer readable program code may be configured to store a document with one or more first portions of text associated with a first classifier. The computer readable program code also may be configured to display the document. The computer readable program code may be configured to change a feature of the first portions of text displayed in the document to indicate that the first portions of text are associated with the first classifier.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
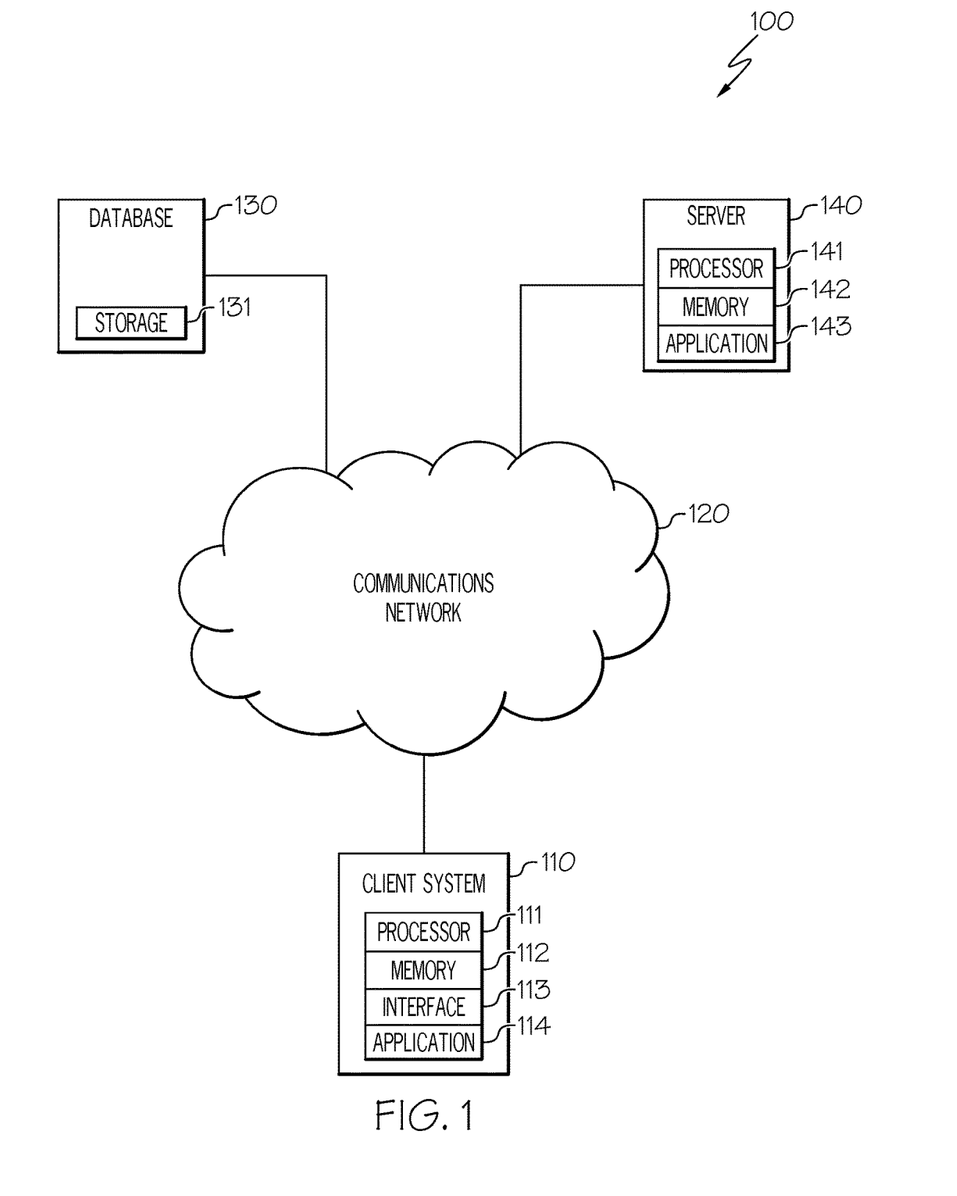
FIG. 1 illustrates an a example system for graphically displaying classifiers matching text in a document, in accordance with particular embodiments.

FIG. 1 illustrates an example embodiment of a system 100 for graphically displaying classifiers matching text in a document. The illustrated embodiment includes client system 110, database 130, server 140, and communications network 120.

Database 130 may include any suitable resources for storing documents, data, and other information. For example, database 130 may include, without limitation, a database or database server (e.g., an SQL database or server), a web service provided by a web server, and/or one or more files stored using the file system of a storage device (e.g., a text file, CSV file, or spreadsheet). Storage 131 may be any suitable resource for storing data and/or other information, including, without limitation, a magnetic disk, flash memory, optical disk, or any other suitable local or remote data storage device. In the illustrated embodiment, database 130 is communicatively coupled to the server 140 and client system 110 over communications network 120. In other embodiments, database 130 may be implemented locally on client system 110 or server 140.

Client system 110 may communicate with database 130 and server 140. Client system 110 may comprise any suitable hardware, software or encoded logic for performing the functionality described herein as associated with client system 110. In the illustrated embodiment, client system 110 includes a processor 111, memory 112, interface 113, and application 114. Processor 111 may be a microprocessor, controller, or any other suitable computing device, resource, or combination of hardware, software, and/or encoded logic operable to perform functionality associated with client system 110. Memory 112 may be any form of volatile or non-volatile memory including, without limitation, magnetic data, optical media, random access memory (RAM), read-only memory (ROM), removable media, or any other suitable local or remote memory component, for storing information associated with the functionality discussed herein. Interface 113 may include a user interface, such as a display, a touchscreen, a microphone, a keypad, or other appropriate terminal equipment usable by a user.

Application 114 of client system 110 may execute on processor 111 and may submit queries to database 130 or server 140. Application 114 may also receive data from database 130 or server 140. Data received by application 114 may include documents or groups of documents. Application 114 may be any suitable combination of hardware, software and/or encoded logic capable of performing the functionality described herein when executed by processor 111.

Application 114 may be an application for graphically displaying a document and identifying text in the document that satisfies the parameters of one or more classifiers. Application 114 may receive user input selecting a document from a group of documents stored on database 130, server 140, or client system 110. Application 114 may be operable to display the selected document using interface 113 of client system 110. In a particular embodiment, application 114 may identify text by visually differentiating text that satisfies the parameters of one or more classifiers. In a particular embodiment, application 114 may highlight the text that satisfies the parameters of a classifier. In an alternative embodiment, application may change a feature of the text, such as font type, font style, font color, font size, or background color. The font style may include effects, such as italics, underlining, or bold face. In a particular embodiment, application 114 may also display a list of classifiers with parameters satisfied by text in the selected document.

Application 114 may determine if text in the selected document satisfies the parameters of a classifier in a number of alternative ways. For example, in a particular embodiment, the parameters of a classifier may include stored text, and application 114 may identify text in a document that matches any of the stored text included in the parameters of the classifier. In an alternative embodiment, the parameters of a classifier may include Boolean or logical operations connecting two of more different strings of text, and application 114 may identify text in a document that satisfies the Boolean or logical expression. In an alternative embodiment, the parameters of a classifier may include other classifiers, also called sub-classifiers, and application 114 identifies text that satisfies the parameters of the sub-classifiers. Application 114 may use keyword searching, exact string matching, regular expression, rule matching, fingerprinting/document hashing, statistical matching such as support vector machines, Bayesian Classifiers, and neural networks, lexical analysis, and metadata matching, or other processing techniques to identify text that satisfies parameters of the classifier.

In a particular embodiment, application 114 may identify text satisfying the parameters of a subset of available classifiers based on user input. For example, in a particular embodiment, application 114 may allow a user to select a classifier, and, in response to such a selection, identify text that satisfies the parameters of the selected classifier associated with the selected text. In an alternative embodiment, application 114 may allow a user to select a classifier by selecting text in a displayed document that satisfies the parameters of the classifier. For example, application 114 may receive user input selecting a portion of text associated with a classifier, and, in response to such a selection, identify text in the displayed document that satisfies the parameters of the classifier associated with the selected text. In a particular embodiment, application 114 may also display a list of sub-classifiers matching the selected text, and in response to receiving user input selecting a sub-classifier, application 114 may identify the text of the selected document that satisfies the parameters of the selected sub-classifier by visually differentiated the matching text.

In a particular embodiment, application 114 may differentiate between text associated with different classifiers. For example, application 114 may receive user input selecting a document from a group of documents stored on database 130, server 140, or client system 110. Application 114 may display the selected document using interface 113 of client system 110. Application 114 may also display a list of predefined classifiers along with the selected document using interface 113. Application 114 may receive a user selection of a first predefined classifier, and visually differentiate portions of text satisfying the parameters of the first selected classifier using a first technique. Application 114 may also receive a user selection of a second predefined classifier, and visually differentiate portions of text satisfying the parameters of the second selected classifier using a second technique. By using different techniques to identify text associated with the different classifiers, application may differentiate between text associated with the different classifiers. For example, application 114 may highlight the text associated with the first classifier in a first color and highlight the text associated with the second classifier in a second color.

Application 114 may receive user input to define a new classifier. In a particular embodiment, application 114 may allow a user to define a new classifier by using other classifiers, called sub-classifiers, and defining a relationship, such as an operand, between the sub-classifiers. For example, application 114 may receive input from a user to define a new classifier that identifies a document containing text that satisfies the parameters of two or more sub-classifiers. In a particular embodiment, application 114 allows the user to define Boolean, logical, spacing, or other relationships between two or more classifiers. For example, application 114 may allow user to define parameters for a new classifier to require that text satisfying the parameters of two other selected classifiers appear within a specified spacing of one another. For example, application 114 may allow the user to require that text satisfying the parameters of the selected classifiers appears in the same sentence, line, paragraph, or page. Alternatively, application 114 may allow the user to require that text satisfying the parameters of the selected classifiers appear within a specified number of words, sentences, lines, paragraphs, or pages of one another. For example, application 114 may receive input from a user to define a new classifier to identify text that satisfies the parameters of a first and second sub-classifier within a certain distance from each other, such as within the same paragraph or sentence. Additionally, application 114 may receive user input selecting a predefined classifier and receive user input to modify the classifier by changing the parameters of the classifier.

In an alternative embodiment, application 114 may allow a user to define parameters for a new classifier using text rather than other classifiers. For example, application 114 may allow a user to select one or more portions of text and then define a classifier to identify matching text. In a particular embodiment, application 114 allows the user to define Boolean, logical, spacing, or other relationships between two or more portions of text. Defining a classifier by selecting text may involve keyword searching, exact string matching, regular expression, rule matching, fingerprinting/document hashing, statistical matching such as support vector machines, Bayesian classifiers, and neural networks, lexical analysis, and metadata matching or the like.

However the classifier is defined, application 114 may display a document and visually differentiate text in the document that satisfies the parameters of the new classifier. In a particular embodiment, application 114 may visually differentiate text in real time as the parameters of the classifier are defined or modified. In an alternative embodiment, application 114 may visually differentiate text that satisfies the parameters of the new classifier in response to receiving user input to update the display of the document to show text that satisfies that the parameters of the new classifier.

Server 140 may include any suitable resources for storing documents and other information. For example, server 140 may include, without limitation, a database or database server (e.g., an SQL database or server), a web service provided by a web server, and/or one or more files stored using the file system of a storage device (e.g., a text file, CSV file, or spreadsheet). In the illustrated embodiment, server 140 includes processor 141, memory 142, and application 143. Processor 141 may be a microprocessor, controller, or any other suitable computing device, resource, or combination of hardware, software, and/or encoded logic operable to perform functionality associated with server 140. Memory 142 may be any form of volatile or non-volatile memory including, without limitation, magnetic data, optical media, random access memory (RAM), read-only memory (ROM), removable media, or any other suitable local or remote memory component, for storing information associated with the functionality discussed herein. In the illustrated embodiment, server 140 is communicatively coupled to the database 130 and client system 110 over communications network 120. In other embodiments, server 140 may be implemented locally on client system 110 or database 130. Server 140 may include application 143. Application 143 may perform some or all of the function described above with reference to application 114 of client system 110.

Communications network 120 may facilitate communications among client system 110, database 130, and server 140. Communications network 120 may be any interconnection of components capable of transmitting communication signals, data, and/or messages, such as a local area network (LAN), wide area network (WAN), global distributed network (e.g., the Internet), Intranet, Extranet, or any other form of wireless or wireline communication network.

Figure 2:
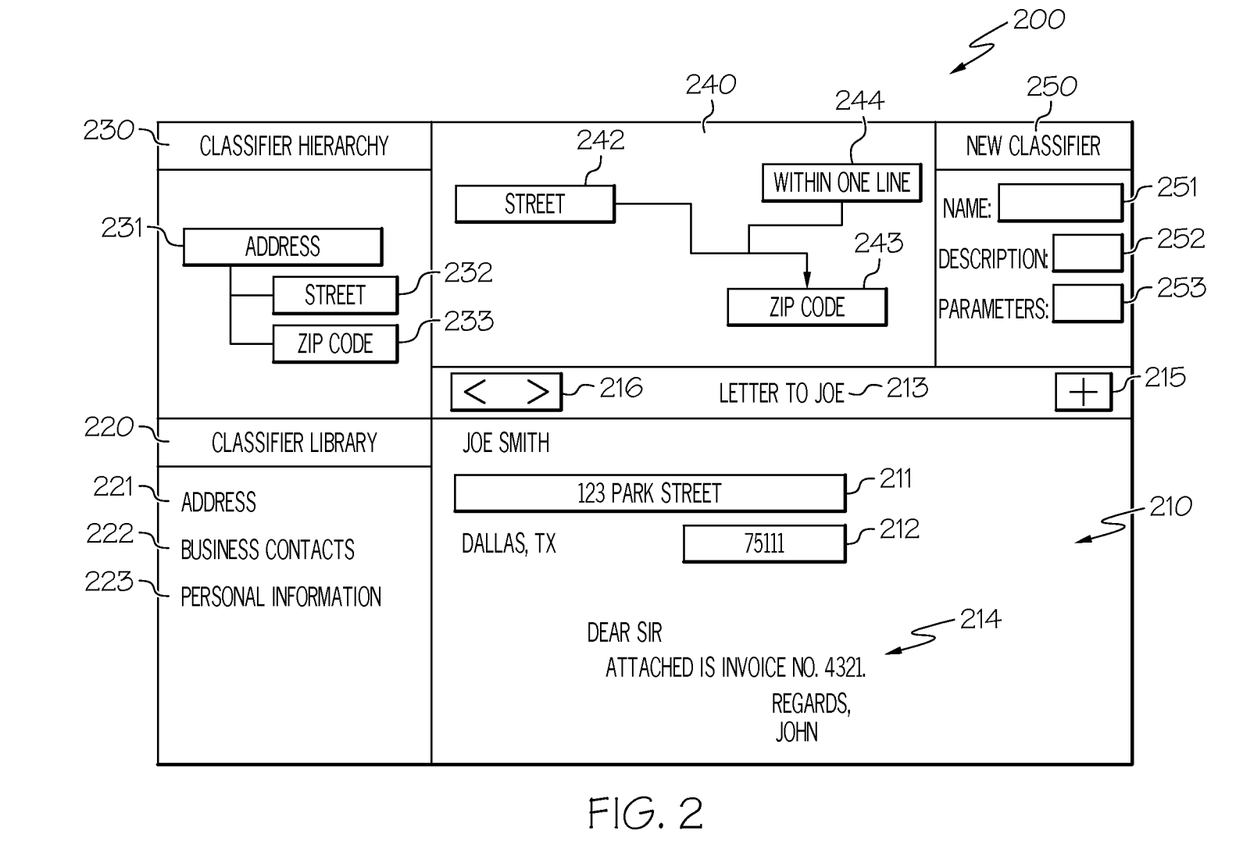
FIG. 2 illustrates an example graphical user interface for designing classifiers using text in a document, in accordance with a particular embodiment.

FIG. 2 illustrates an example graphical user interface 200 for designing classifiers. Graphical user interface 200 may be implemented using system 100 of FIG. 1 and/or any other suitable system. As described with reference to the particular embodiment of FIG. 2, application 114 of client system 110 implements graphical user interface 200. In other embodiments, application 143 of server 140 may implement graphical user interface 200. Graphical user interface 200 includes document display 210, classifier library list 220, selected classifier hierarchy window 230, classifier relationship window 240, and new classifier creation window 250.

Document display 210 may display title 213 of a selected document along with the text 214 of the document. In particular embodiments, application 114 may visually differentiate portions of text 214 associated with classifiers in document display 210. In certain embodiments, application 114 may visually differentiate text that satisfies the parameters of a classifier by changing a feature of the text. For example, the feature of the text that application 114 changes may be a font style, a font color, a font size, or a background color. In the illustrated embodiment, the text "123 PARK STREET" is associated with street classifier 232, and application 114 highlights that text as indicated by highlight box 211 in document display 210. In addition, the text "75111" is associated with zip code classifier 233, and application 114 highlights that text as indicated by highlight box 212 in document display 210. In a particular embodiment, document display 210 may visually differentiate text associated with different classifiers. For example, highlight box 211 may be a different color than highlight box 212. In a particular embodiment, the color of classifiers 232 and 233 in classifier hierarchy window 230 may match the color of highlight boxes 211 and 212 in document display 210 associated with classifiers 232 and 233.

In the illustrated embodiment, document display 210 contains document import button 215 and document selection button 216. Application 114 may receive user input through document import button 215 to import and display a document in document display 210. In particular embodiments, application 114 may receive user input through document import button 215 to import a document stored on client system 110, database 130, or server 140 of FIG. 1. Application 114 may receive user input through document selection button 216 to display a document that application 114 previously imported. In particular embodiments, application 114 may receive user input through document selection button 216 to display a document that application 114 previously imported by receiving input through document import button 215. In a particular embodiment, application 114 may receive input through document import button 215 to import and display a document containing text that should satisfy the parameters of a classifier. In an alternative embodiment, application 114 may receive input through document import button 215 to import and display a document containing text that should not satisfy the parameters of a classifier. In yet another embodiment, application 114 may receive input through document selection button 216 to display a previously imported document as a classifier is created or modified.

Classifier library list 220 may display a list of predefined classifiers. In a particular embodiment, application 114 may receive a user selection of a predefined classifier from list 220, and in response application 114 may highlight, or otherwise visually differentiate, text matching the selected classifier in document display 210. For example, application 114 may receive a user selection of address classifier 221. When application 114 receives this selection, application 114 may display highlight boxes 211 and 212 associated with classifier 221 in document display 210. A classifier selected from list 220 may also be displayed in selected classifier hierarchy window 230. For example, when application 114 receives a user selection of address classifier 221 in classifier library 220 as discussed above, application 114 may display address classifier 231 in classifier hierarchy window 230. Additionally, application 114 may display, in classifier hierarchy window 230, sub-classifiers 232 and 233 associated with selected classifier 231. For example, in the illustrated embodiment, classifier hierarchy window 230 includes street classifier 232 and zip code classifier 233 which both serve as sub-classifiers to address classifier 231.

In certain embodiments, application 114 may receive user input selecting one of the sub-classifiers displayed in classifier hierarchy window 230. Application 114 may highlight text displayed in document display 210 matching the selected sub-classifier. For example, when application 114 receives user input selecting street classifier 232 in classifier hierarchy window 230, application 114 may use highlight box 211 in document display 210 to identify the text "123 PARK STREET" associated with street classifier 232.

Classifier relationship window 240 may display a relationship between classifiers acting as sub-classifiers. For example, in the illustrated embodiment, window 240 displays street classifier 242 and zip code classifier 243, which correspond to street classifier 232 and zip code classifier 233 acting as sub-classifiers for address classifier 231 in classifier hierarchy window 230. Classifier relationship window 240 may display an operand creating a relationship between the displayed classifiers. For example, in the illustrated embodiment, classifier relationship window 240 includes a within-one-line operand 244 showing that the address classifier 231 requires that text associated with street classifier 242 be within one line of text associated with zip code classifier 243. In an embodiment, window 240 may receive user input to modify within-one-line operand 244, or to create a new operand defining the relationship between street classifier 242 and zip code classifier 243 displayed in window 240. For example, window 240 may receive user input to require that text associated with street classifier 242 and text associated with zip code classifier 243 be located within a certain distance of each other in the document, such as within the same paragraph, page, or within a certain number of terms or characters.

Application 114 may receive input through new classifier creation window 250 to create a new classifier. New classifier creation window may contain a name field 251, description field 252, and parameters field 253. Name field 251 may receive a name for a new classifier. For example, classifier 221 has the name "address." Description field 252 may receive a description for a new classifier. Parameters field 253 may receive parameters for a new classifier. In one embodiment, parameters received in parameters field 253 may include predefined classifiers selected from classifier library 220. For example, application 114 may receive selection of classifiers 222 and 223 from classifier library 220 for use in defining a new classifier through parameters field 253. In another embodiment, parameters field 253 may receive user input to select an operand defining a relationship between selected predefined classifiers. In alternative embodiments, parameters field 253 may receive user input to define parameters of an operand. In yet another embodiment, parameters field 253 may receive input choosing a detection technique for the new classifier, such as keyword searching, exact string matching, regular expression, rule matching, fingerprinting/document hashing, statistical matching such as support vector machines, Bayesian classifiers, and neural networks, lexical analysis, and metadata matching or the like. In a further embodiment, parameters field 253 may receive user input changing parameters associated with the chosen detection technique.

Document display 210 may highlight text matching the newly created classifier as the user is creating the classifier to allow the user to see the impact various detection technique and parameter choices have on matching text. In yet another embodiment, application 114 may receive selection of text in document display 210 to be added to a list of text matching the newly defined classifier. In particular embodiments, application may receive input through window 250 to add the new classifier to the classifier library list 220.

Figure 3:
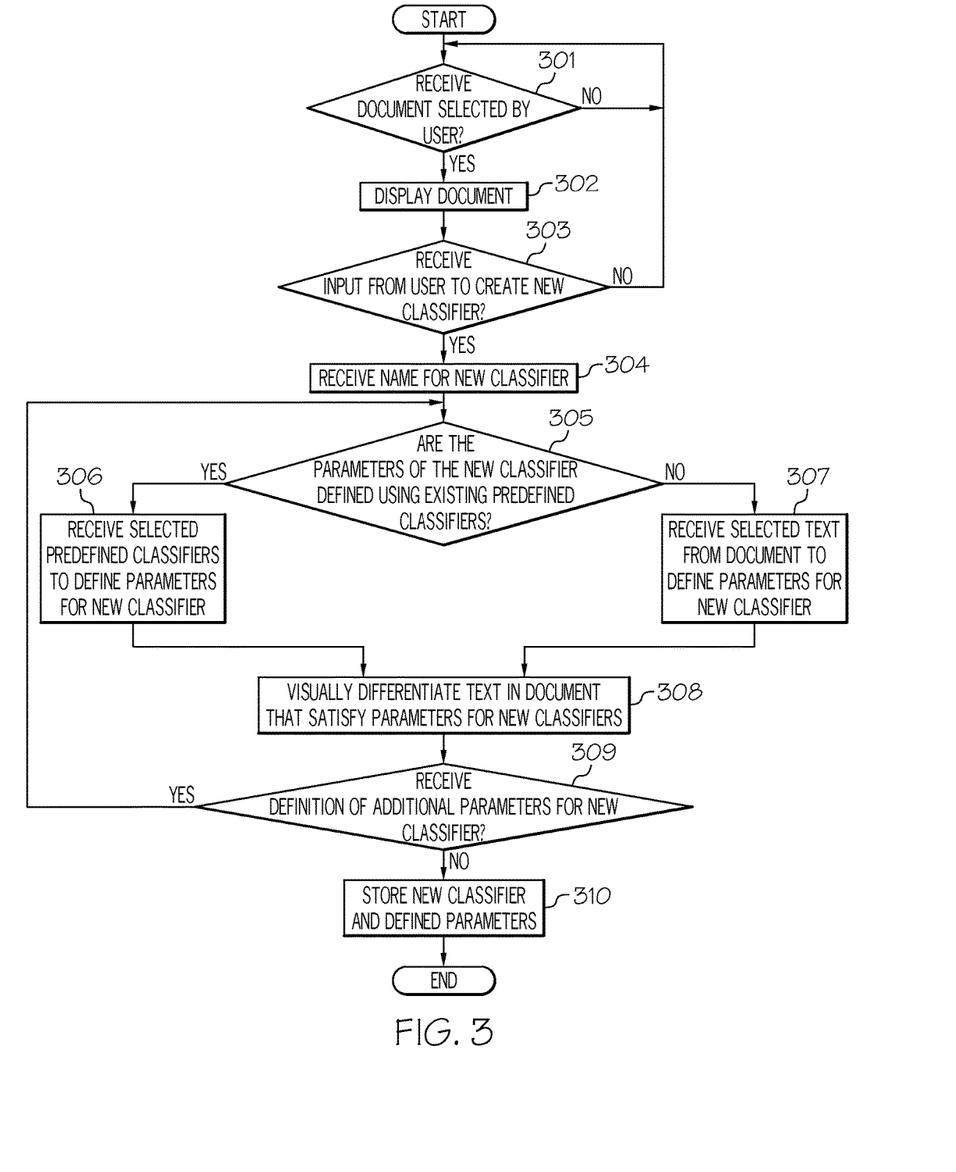
FIG. 3 illustrates an example method for designing classifiers using text in a document, in accordance with a particular embodiment.

FIG. 3 illustrates an example method 300 for designing classifiers using text in a document. Method 300 may be implemented using system 100 of FIG. 1 and/or any other suitable system. As described with reference to the particular embodiments of FIG. 3, application 114 of client system 110 implements method 300. In other embodiments, application 143 of server 140 may implement method 300.

Method 300 begins at process block 301, a document selected by a user is received. In particular embodiments, the document may be stored on database 130, server 140, or client system 110. At process block 302, the document is displayed. In a particular embodiment, application 114 may display the text of the document. In an alternative embodiment, application 114 may also display a list of classifiers matching text in the document. In another alternative embodiment, application 114 may display a list of predefined classifiers, which may or may not match text in the displayed document.

At process block 303, input from a user to create a new classifier may be received. If input from a user to create a new classifier is received, the method continues at process block 304. If user input to create a new classifier is not received, method 300 may return to process block 301, where a document selected by a user may be received.

At process block 304, a name for the new classifier is received. At process block 305, user input selecting to define the parameters of the new classifier using existing predefined classifiers may be received. If user input selecting to define the parameters of the new classifier using existing predefined classifiers is received at process block 305, then the method continues at process block 306. If user input selecting to define the parameters of the new classifier using preexisting classifiers is not received, method 300 continues at process block 307.

At process block 306, selected predefined classifiers to define parameters for the new classifier are received. For example, application 114 may receive a selection of predefined classifiers selected by a user from classifier library 220 of FIG. 2. In a particular embodiment, application 114 may receive user input selecting more than one predefined classifier and allow the user to define a relationship between the classifiers using an operand. For example, application 114 may receive input from a user to define the new classifier to identify a document containing text that matches both a first and a second selected classifier. In an alternative embodiment, application 114 may receive input from a user to define the new classifier to identify text that matches both the first and second classifiers if the text matching the first and second classifiers are within a certain distance from each other, such as within the same paragraph or sentence. In a particular embodiment, application 114 may receive input to modify a selected predefined classifier by selecting text in the displayed document to add to the selected predefined classifier. In another embodiment, application 114 may receive input from the user to add terms to the classifier without a user selecting text in the displayed document. In yet another embodiment, application 114 may receive input to change parameters associated with the selected predefined classifier's detection technique.

If user input selecting to define the parameters of the new classifier using existing predefined classifiers is not received at process block 305, then a user selection of text from the displayed document to define parameters for the new classifier may be received at process block 307. In a particular embodiment, application 114 may receive input from the user to add terms to the classifier without a user selection of text in the displayed document. In another embodiment, application 114 may receive user input selecting a detection technique for the new classifier. For example, application 114 may receive user input selecting one or more of a variety of detection techniques, including without limitation, keyword searching, exact string matching, regular expression, rule matching, fingerprinting/document hashing, statistical matching such as support vector machines, Bayesian classifiers, and neural networks, lexical analysis, and metadata matching or the like. In a particular embodiment, application 114 may receive input from a user to change parameters associated with the selected detection techniques.

At process block 308, text that satisfies the parameters of the new classifier is visually differentiated. In certain embodiments, application 114 may visually differentiate text that satisfies the parameters of a classifier by changing a feature of the text. For example, the feature of the text that application 114 changes may be a font style, a font color, a font size, or a background color. In another embodiment, application 114 receives user input to change parameters associated with a detection technique in process blocks 306 or 307. Application 114 may display changes in the matching text corresponding to changes in the parameters by visually differentiating text matching the modified classifier.

At process block 309, user input to define additional parameters for the new classifier may be received. If user input to define additional parameters for the new classifier is received, method 300 may return to process block 305, where the user may select whether to use predefined classifiers to define the additional parameters. If user input to define additional parameters for the new classifier is not received, method 300 continues to process block 310, where the new classifier and its parameters are stored, and method 300 ends. In a particular embodiment, after application 114 stores the new classifier, application 114 may return to process block 301 to allow a user to select a new document. Application 114 may display the new document and visually differentiate text in the new document that matches the newly created classifier.

Figure 4:
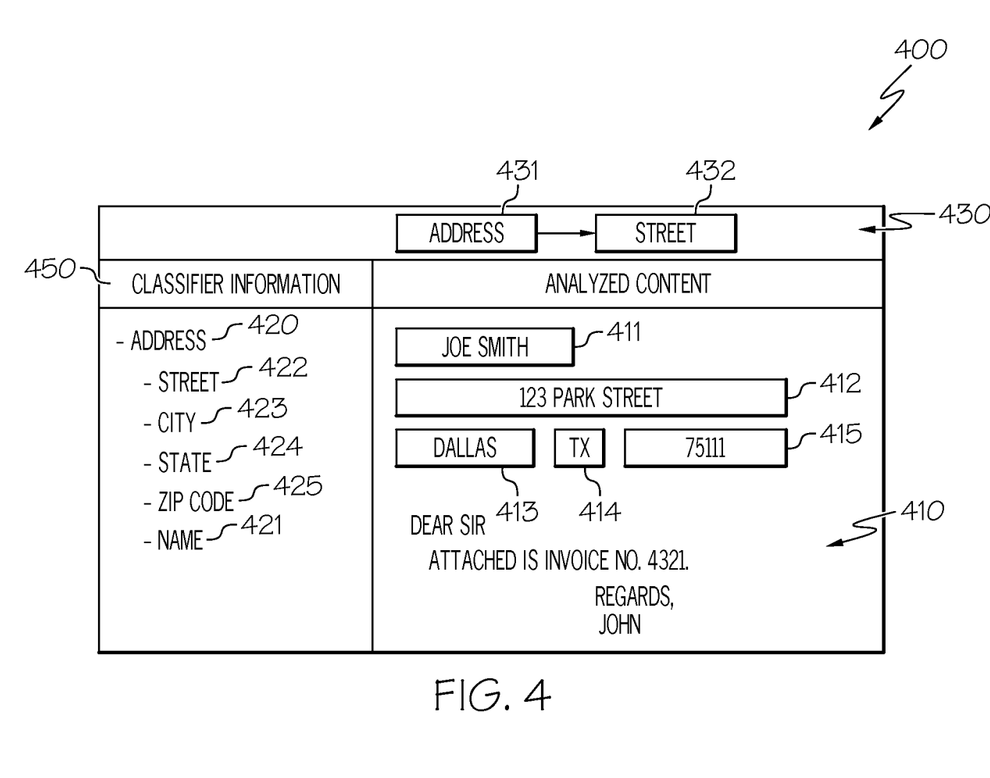
FIG. 4 illustrates an example graphical user interface for displaying classifiers matching text in a document, in accordance with a particular embodiment.

FIG. 4 illustrates an example graphical user interface 400 for displaying classifiers matching text in a document. Graphical user interface 400 may be implemented using system 100 of FIG. 1 or any other suitable system. As described with reference to the particular embodiments of FIG. 4, application 114 of client system 110 implements graphical user interface 400. In other embodiments, application 143 of server 140 may implement graphical user interface 400. The illustrated embodiment includes document display 410, classifier information display 450, and classifier hierarchy 430.

In a particular embodiment, document display 410 may display the text of a document. Document display 410 may display text that satisfies the parameters of a classifier by changing a feature of that text so as to visually differentiate the matching text from text not matching a classifier. In particular embodiments, the feature of the text that application 114 changes may be a font style, a font color, a font size, or a background color, commonly known as highlighting. In the illustrated embodiment, the text "123 PARK STREET" is associated with street classifier 422, and application 114 highlights that text as indicated by highlight box 412 in document display 410. In addition, the text "75111" is associated with zip code classifier 425, and application 114 highlights that text as indicated by highlight box 415 in document display 410. In a particular embodiment, document display 410 may visually differentiate text associated with different classifiers. For example, highlight box 412 may be a different color than highlight box 415. In a particular embodiment, the color of classifiers 422 and 425 in classifier information window 450 may match the color of highlight boxes 412 and 415 in document display 410 associated with classifiers 422 and 425.

Classifier information display 450 may display a list of classifiers satisfied by text in the document displayed in document display 410. In the illustrated embodiment, classifier information display 450 displays address classifier 420. Classifier information display 450 may allow application 114 to receive user input selecting one of address classifier 420, name classifier 421, street classifier 422, city classifier 423, state classifier 424, and zip code classifier 425. In one embodiment, application 114 may receive user input selecting one of address classifier 420, name classifier 421, street classifier 422, city classifier 423, state classifier 424, and zip code classifier 425 from classifier information display 450, and in response application 114 may display the document in document display 410 with only portions of the text satisfying the parameters of selected address classifier 420, name classifier 421, street classifier 422, city classifier 423, state classifier 424, and zip code classifier 425 highlighted. For example, in the illustrated embodiment, application 114 may receive user input selecting address classifier 420, causing application 114 to highlight the text satisfying the parameters of address classifier 420. In this particular embodiment, application 114 could highlight the text satisfying the parameters of name classifier 421, street classifier 422, city classifier 423, state classifier 424, and zip code classifier 425 used as sub-classifiers to define address classifier 420. For example, in this particular embodiment, application 114 could highlight the text contained in highlight boxes 411, 412, 413, 414, and 415 in document display 410. In another embodiment, application 114 may receive user input selecting a classifier from classifier information display 450 resulting in a list parameters for the selected classifier being displayed in classifier information display 450. In a particular embodiment, classifier information display 450 may display parameters of the selected classifier that include other classifiers, known as sub-classifiers. In the illustrated embodiment, classifier information display 450 also displays name classifier 421, street classifier 422, city classifier 423, state classifier 424, and zip code classifier 425, which are parameters of address classifier 420. In the illustrated embodiment, application 114 may receive user input selecting street classifier 422. In response, application 114 may display the text in document display 410 with the text contained in highlight box 412 highlighted.

Classifier hierarchy 430 may display a hierarchy of classifiers and sub-classifiers with parameters currently satisfied by text displayed in document display 410. In a particular embodiment, classifier hierarchy may be represented by a breadcrumb type trail and allow navigation between levels of classifiers and sub-classifiers that have been selected. For example, in the illustrated embodiment, classifier hierarchy 430 displays address classifier 431 and street classifier 432, with street classifier 432 being a sub-classifier of address classifier 431. In the illustrated embodiment, address classifiers 431 and 420 represent the same classifier and street classifiers 432 and 422 represent the same classifier. In the illustrated embodiment, classifier hierarchy 430 displays address classifier 431 and street classifier 432 as a result of application 114 receiving user input selecting street classifier 422 in classifier information display 450. In an another embodiment, classifier hierarchy 430 displays address classifier 431 and street classifier 432 as a result of application 114 receiving user input selecting text contained in highlight box 412, which satisfies the parameters of street classifier 422.

In a particular embodiment, application 114 may receive user input selecting a portion of the highlighted text displayed in document display 410. For example, application 114 may receive user input selecting the text contained in highlight box 412. In a particular embodiment, receiving user input selecting the text contained in highlight box 412 may cause application 114 to display street classifier 422 in classifier information display 450. In a particular embodiment, receiving user input selecting the text contained in highlight box 412 may cause application 114 to display street classifier 432 as a sub-classifier to address classifier 431 in a breadcrumb type trail present in classifier hierarchy 430. In another embodiment, receiving user input selecting the text contained in highlight box 412 may cause application 114 to display the text in document display 410 such that only text satisfying street classifier 422 is highlighted.

Figure 5:
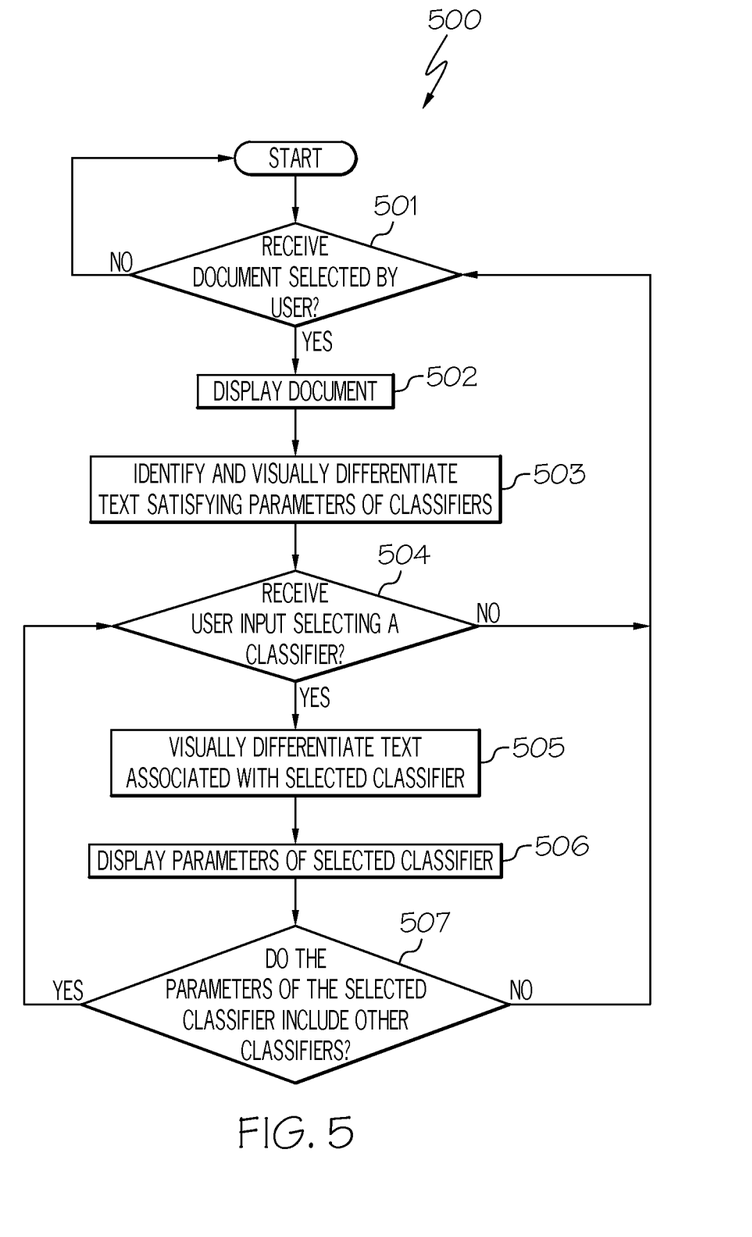
FIG. 5 illustrates an example method for graphically displaying classifiers matching text in a document, in accordance with a particular embodiment.

FIG. 5 illustrates an example method 500 for graphically displaying classifiers matching text in a document. Method 500 may be implemented using system 100 of FIG. 1 and/or any other suitable system. As described with reference to the particular embodiments of FIG. 5, application 114 of client system 110 implements method 500. In other embodiments, application 143 of server 140 may implement method 500.

Method 500 begins at process block 501, where a document selected by the user is received. In certain embodiments, database 130, server 140, or client system 110 may store the document. At process block 502, the document is displayed. The display of the document may include the text of the document and/or a list of classifiers matching text in the document.

At process block 503, portions of text in the displayed document that satisfy the parameters of classifiers are visually differentiated. In certain embodiments, application 114 may visually differentiate text that satisfies the parameters of a classifier by changing a feature of the text. For example, the feature of the text that application 114 changes may be a font style, a font color, a font size, or a background color. Application 114 may identify portions of text satisfying the parameters of a classifier using a variety of detection techniques including, without limitation, keyword searching, exact string matching, regular expression, rule matching, fingerprinting/document hashing, statistical matching such as support vector machines, Bayesian classifiers, and neural networks, lexical analysis, and metadata matching or the like. For example, a classifier may be defined such that it will be satisfied by text containing the terms "Corporation A," "Corporation B," or "Corporation C." If the text contains the terms "Corporation A" and "Corporation C," application 114 may highlight these terms to identify that they satisfy the classifier. Additionally, in certain embodiments, at process block 503, application 114 may visually differentiate text satisfying different classifiers. For example, application 114 may highlight text satisfying a first classifier in a different color than text satisfying a second classifier.

At process block 504, user input selecting a classifier may be received. In a particular embodiment, application 114 may receive user input selecting a portion of text associated with a classifier. If user input selecting a classifier is not received at process block 504, method 500 may return to process block 501. If user input selecting a classifier is received at process block 504, text satisfying the parameters of the selected classifier is visually differentiated at process block 505. In a particular embodiment, application 114 may visually differentiate text satisfying the parameters of the selected classifier by displaying the text satisfying the parameters of other classifiers in different colors from text satisfying the parameters of the selected classifier. In another embodiment, application may not visually differentiate text satisfying the parameters of other classifiers and only visually differentiate text satisfying the parameters of the selected classifier. In a particular embodiment, application 114 may visually differentiate text by highlighting the text. In an alternative embodiment, application 114 may visually differentiate text by changing a feature of the text such as the font style, font color, font size, or background color.

At process block 506, parameters of the selected classifier are displayed. In a particular embodiment, parameters of the selected classifier may include other classifiers. These other classifiers may be referred to as sub-classifiers with respect to the selected classifier. In another embodiment, parameters of the selected classifier may include operands defining a relationship between other classifiers making up the selected classifier, such as AND/OR operators or operands requiring text satisfying the other classifiers to occur within a certain proximity to one another in the selected document. In yet another embodiment, parameters of the selected classifier may include parameters of the detection techniques associated with the selected classifier.

If the parameters of the selected classifier include other classifiers at process block 507, user input may be received selecting of one of the classifiers that is a parameter of the classifier previously selected at process block 504. In a particular embodiment, at process block 504, application 114 may display a hierarchy of selected classifiers and sub-classifiers. The hierarchy may take the form of a "breadcrumb trail" to allow users to easily navigate between various layers of classifiers and sub-classifiers. If the parameters of the selected classifier do not include other classifiers, method 500 returns to process block 501 user input selecting another document may be received. In an alternative embodiment, if the parameters of the selected classifier do not include other classifiers, application 114 returns to process block 504 and may receive user input selecting a different classifier than was selected previously in process block 504.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for displaying a document with classified text, comprising:
   receiving a plurality of classifiers;
   receiving from a user an input selecting a document to display;
   displaying the document;
   receiving from the user an input defining a relationship between a first classifier of the plurality of classifiers and a second classifier of the plurality of classifiers, wherein the relationship requires text satisfying the first classifier to occur within a first proximity of text satisfying the second classifier;
   displaying the user-defined relationship between the first classifier and the second classifier;
   creating a new classifier based on the user-defined relationship between the first classifier and the second classifier;
   receiving from the user an input selecting a portion of text in the document;
   determining, using a processor, whether the selected portion of text of the document is associated with the new classifier;
   in response to determining that the selected portion of text of the document is associated with the new classifier:
      changing a feature of the selected portion of text of the document to indicate that the selected portion of text of the document is associated with the new classifier;
      storing the new classifier to a list; and
      displaying the list.

2. The method of claim 1, further comprising:
   receiving from the user an input selecting a second portion of text of the document;
   defining a third classifier based on the user-selected portion of text of the document;
   determining, using a processor, all portions of text of the document that are associated with the third classifier, including the user-selected portion of text; and
   in response to determining all portions of text of the document that are associated with the third classifier, updating the display in real-time by highlighting all portions of text of the document that are associated with the third classifier.

3. The method of claim 1, wherein the relationship requiring text satisfying the first classifier to occur within the first proximity of text satisfying the second classifier further requires that the text satisfying the first classifier occur within a specified number of words of the text satisfying the second classifier,
   wherein the specified number of words is input by the user.

4. The method of claim 1, further comprising:
   receiving from the user an input selecting a subset of the one or more portions of text associated with the new classifier;

identifying a first sub-classifier associated with the subset of the one or more portions of text in response to receiving the input selecting the subset of the one or more portions of text; and displaying the list of classifiers and the first sub-classifier associated with the subset of the first portions of text.

5. The method of claim 4, wherein displaying the list of classifiers and the first sub-classifier associated with the subset of the one or more portions of text further comprises displaying a hierarchical relationship between each of the classifiers in the list of classifiers and the first sub-classifier.

6. The method of claim 5, wherein the hierarchical relationship between each of the classifiers in the list of classifiers and the first sub-classifier is displayed using lines or arrows in a tree structure.

7. The method of claim 1, further comprising:
displaying the list of classifiers to the user;
receiving from the user an input selecting one or more classifiers of the displayed list of classifiers;
identifying all portions of text in the document associated with the one or more selected classifiers; and
changing a feature of each portion of text in the document associated with the one or more selected classifiers on the display.

8. The method of claim 7, further comprising:
receiving from the user an input selecting one of a plurality of sub-classifiers associated with the one or more selected classifiers;
identifying all portions of text associated with the selected sub-classifier; and
changing a feature of each portion of text in the document associated with the one or more selected classifiers on the display.

9. The method of claim 1, wherein at least one classifier of the plurality of classifiers is acting as a sub-classifier.

10. The method of claim 1, further comprising displaying a hierarchy of the plurality of classifiers simultaneously with displaying the user-defined relationship between the first classifier and the second classifier.

11. A computer program product comprising:
a non-transitory computer readable storage medium having computer readable program code embodied therewith, the computer readable program code comprising:
computer readable program code configured to receive a plurality of classifiers;
computer readable program code configured to receive from a user an input selecting a document to display;
computer readable program code configured to display the document;
computer readable program code configured to receive from the user an input defining a relationship between a first classifier of the plurality of classifiers and a second classifier of the plurality of classifiers, wherein the relationship requires text satisfying the first classifier to occur within a first proximity of text satisfying the second classifier;
computer readable program code configured to display the user-defined relationship between the first classifier and the second classifier;
computer readable program code configured to create a new classifier based on the user-defined relationship between the first classifier and the second classifier;
computer readable program code configured to receive from the user an input selecting a portion of text in the document;
computer readable program code configured to determine, using a processor, whether the selected portion of text of the document is associated with the new classifier; and
computer readable program code configured to, in response to determining that the selected portion of text of the document is associated with the new classifier:
change a feature of the selected portion of text of the document to indicate that the selected portion of text of the document is associated with the new classifier;
store the new classifier to a list; and
display the list.

12. The computer program product of claim 11, further comprising:
computer readable program code configured to receive from the user an input selecting a second portion of text of the document;
computer readable program code configured to define a third classifier based on the user-selected portion of text of the document;
computer readable program code configured to determine, using a processor, all portions of text of the document that are associated with the third classifier, including the user-selected portion of the text; and
computer readable program code configured to, in response to determining all portions of text of the document that are associated with the third classifier, update the display in real-time by highlighting all portions of text of the document that are associated with the third classifier.

13. The computer program product of claim 11, wherein the relationship requiring text satisfying the first classifier to occur within the first proximity of text satisfying the second classifier further requires that the text satisfying the first classifier occur within a specified number of words of the text satisfying the second classifier,
wherein the specified number of words is input by the user.

14. The computer program product of claim 11, further comprising:
computer readable program code configured to receive from the user an input selecting a subset of the one or more portions of text associated with the new classifier;
computer readable program code configured to identify a first sub-classifier associated with the subset of the one or more portions of text in response to receiving the input selecting the subset of the first portions of text; and
computer readable program code configured to display the list of classifiers and the first sub-classifier associated with the subset of the first portions of text.

15. The computer program product of claim 14, wherein computer readable program code configured to display the list of classifiers and the first sub-classifier associated with the subset of the one or more portions of text further comprises computer readable program code configured to display a hierarchical relationship between the each of the classifiers in the list of classifiers and the first sub-classifier.

16. The computer program product of claim 15, wherein the hierarchical relationship between each of the classifiers in the list of classifiers and the first sub-classifier is displayed using lines or arrows in a tree structure.

17. The computer program product of claim 11, further comprising:

computer readable program code configured to display the list of classifiers to the user;

computer readable program code configured to receive from the user an input selecting one or more classifiers;

computer readable program code configured to identify all portions of text in the document associated with the one or more selected classifiers; and computer readable program code configured to change a feature of each portion of text displayed in the document associated with the one or more selected classifiers on the display.

18. The computer program product of claim 17, further comprising:

computer readable program code configured to receive from the user an input selecting one of a plurality of sub-classifiers associated with the one or more selected classifier;

computer readable program code configured to identify all portions of text associated with the selected sub-classifier; and computer readable program code configured to change a feature of each portion of text in the document associated with the one or more selected classifiers on the display.

19. The computer program product of claim 11, wherein at least one classifier of the plurality of classifiers is acting as a sub-classifier.

20. The computer program product of claim 11, further comprising computer readable program code configured to display a hierarchy of the plurality of classifiers simultaneously with displaying the user-defined relationship between the first classifier and the second classifier.

* * * * *